US009721587B2

(12) United States Patent
Klein et al.

(10) Patent No.: US 9,721,587 B2
(45) Date of Patent: Aug. 1, 2017

(54) VISUAL FEEDBACK FOR SPEECH RECOGNITION SYSTEM

(71) Applicant: MICROSOFT TECHNOLOGY LICENSING, LLC, Redmond, WA (US)

(72) Inventors: Christian Klein, Duvall, WA (US); Meg Niman, Seattle, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 338 days.

(21) Appl. No.: 13/749,392

(22) Filed: Jan. 24, 2013

(65) Prior Publication Data

US 2014/0207452 A1    Jul. 24, 2014

(51) Int. Cl.

| G10L 15/00 | (2013.01) |
| G10L 15/26 | (2006.01) |
| G10L 21/10 | (2013.01) |
| G06F 3/16  | (2006.01) |
| G06F 3/03  | (2006.01) |
| G10L 15/22 | (2006.01) |

(52) U.S. Cl.
CPC ............ *G10L 21/10* (2013.01); *G06F 3/0304* (2013.01); *G06F 3/167* (2013.01); *G10L 2015/225* (2013.01)

(58) Field of Classification Search
CPC ... G10L 21/10; G10L 2015/225; G10L 15/32; G10L 15/00; G10L 15/26; G06F 3/167
USPC ...... 704/231, 235, 246, 255, 270.1; 382/100
See application file for complete search history.

(56) References Cited

U.S. PATENT DOCUMENTS

| 5,819,225 A  | 10/1998 | Eastwood et al. |
| 6,075,534 A  | 6/2000  | VanBuskirk et al. |
| 7,099,829 B2 | 8/2006  | Gomez |
| 7,349,851 B2 | 3/2008  | Zuberec et al. |
| 8,005,679 B2 | 8/2011  | Jordan et al. |

(Continued)

FOREIGN PATENT DOCUMENTS

EP    2211337 A1    7/2010

OTHER PUBLICATIONS

MacManus, Christopher, "Why we believe most of the massive Xbox roadmap rumor", Retrieved at <<http://news.cnet.com/8301-17938_105-57454722-1/why-we-believe-most-of-the-massive-xbox-roadmap-rumor/>>, Jun. 17, 2012, pp. 13.

(Continued)

*Primary Examiner* — Pierre-Louis Desir
*Assistant Examiner* — Seong Ah A Shin
(74) *Attorney, Agent, or Firm* — Alleman Hall Creasman & Tuttle LLP

(57) ABSTRACT

Embodiments are disclosed that relate to providing visual feedback in a speech recognition system. For example, one disclosed embodiment provides a method including displaying a graphical feedback indicator having a variable appearance dependent upon a state of the speech recognition system. The method further comprises receiving a speech input, modifying an appearance of the graphical feedback indicator in a first manner if the speech input is heard and understood by the system, and modifying the appearance of the graphical feedback indicator in a different manner than the first manner if the speech input is heard and not understood.

16 Claims, 8 Drawing Sheets

(56) References Cited

U.S. PATENT DOCUMENTS

| | | | |
|---|---|---|---|
| 8,140,335 B2 | 3/2012 | Kennewick et al. | |
| 8,265,341 B2* | 9/2012 | Dernis | G06K 9/00892 |
| | | | 379/88.01 |
| 8,510,109 B2* | 8/2013 | Terrell, II | G10L 15/01 |
| | | | 369/25.01 |
| 8,781,156 B2* | 7/2014 | Dernis | G06K 9/00892 |
| | | | 379/88.01 |
| 2003/0050785 A1 | 3/2003 | Friedrich et al. | |
| 2006/0075422 A1* | 4/2006 | Choi | G01S 3/7864 |
| | | | 725/18 |
| 2006/0178878 A1* | 8/2006 | Schmid | G06F 3/167 |
| | | | 704/231 |
| 2009/0037171 A1* | 2/2009 | McFarland | G10L 15/26 |
| | | | 704/235 |
| 2012/0022872 A1* | 1/2012 | Gruber | G06F 17/279 |
| | | | 704/270.1 |
| 2012/0089392 A1 | 4/2012 | Larco et al. | |
| 2012/0117312 A1 | 5/2012 | Chan et al. | |
| 2012/0316876 A1* | 12/2012 | Jang | G06F 3/167 |
| | | | 704/246 |
| 2013/0238336 A1* | 9/2013 | Sung | G10L 15/32 |
| | | | 704/255 |
| 2014/0052785 A1* | 2/2014 | Sirpal | H04N 5/44 |
| | | | 709/204 |

OTHER PUBLICATIONS

Kaila, et al., "Development of a location-aware speech control and audio feedback system", Retrieved at <<http://ieeexplore.ieee.org/stamp/stamp.jsp?tp=&arnumber=4912785>>, In the International Conference on Pervasive Computing and Communications, IEEE, Mar. 13, 2009, pp. 4.

ISA European Patent Office, International Search Report & Written Opinion for PCT Application No. PCT/US2014/012229, Mar. 25, 2014, 10 Pages.

Fujita, et al., "A New Digital TV Interface Employing Speech Recognition", In IEEE Transactions on Consumer Electronics, vol. 49, Issue 3, Aug. 2003, pp. 765-769.

* cited by examiner

VISUAL FEEDBACK FOR SPEECH RECOGNITION SYSTEM

BACKGROUND

Some speech recognition systems may operate in multi-user environments, where voice commands may be provided from multiple users at various volumes and from various locations within a room. In some situations it may be difficult to determine which user is currently interacting with the speech recognition system, and/or whether a speech input is being heard and understood by a computing device receiving the speech input.

SUMMARY

Embodiments are disclosed that relate to providing visual feedback in a speech recognition system. For example, one disclosed embodiment provides a method including displaying a graphical feedback indicator having a variable appearance dependent upon a state of the speech recognition system. The method further comprises receiving a speech input, modifying an appearance of the graphical feedback indicator in a first manner if the speech input is heard and understood by the system, and modifying the appearance of the graphical feedback indicator in a second, different manner if the speech input is heard and not understood.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

Figure 1:
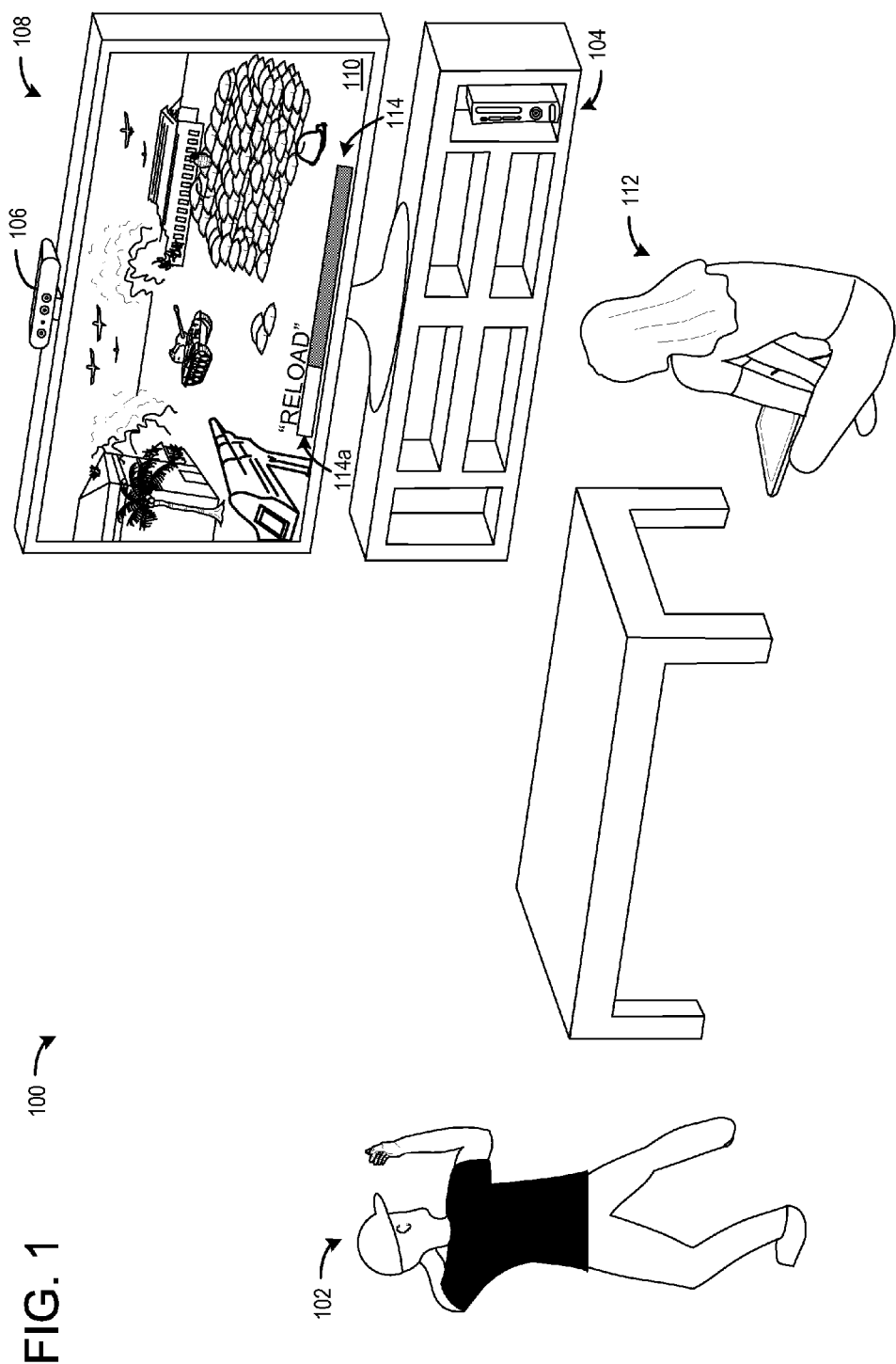
FIG. 1 shows an example multi-user environment for a speech recognition system in accordance with an embodiment of the present disclosure.

As mentioned above, some speech recognition systems may operate in multi-user environments, where voice commands may be provided from multiple users at various volumes and from various locations within a room. However, speech recognition systems may have simple feedback mechanisms for alerting users of a current interaction state, or may not utilize any feedback mechanism at all. While such speech recognition systems may be sufficient for single-user environments, the complexities of multi-user environments and/or multi-application environments may lead to confusion during use, as a speech recognition system may not respond as expected to intended speech commands. Further, it may be difficult for a user to pinpoint the problem in order to modify their behavior or find a solution.

A speech recognition system may operate in various states and perform various tasks in the process of speech receipt and recognition. For example, a speech recognition system may at times operate in a restricted or passive listening state in which the speech recognition system listens only for a trigger to wake up and enter an active listening state. Thus, in the passive listening state, a limited number of recognized speech commands may be supported. In an active listening state, the speech recognition system may receive and analyze detected speech to determine corresponding actions to take on a computing device. A speech input system may utilize different active listening states that correspond to different computing device contexts, such as an application context or an operating system context. As such, speech inputs may be interpreted differently in different active listening contexts, and even in different contexts in a same application.

Various parameters may affect whether a speech input is properly heard and understood by the computing system. For example, if the speech recognition system does not detect the speech input at a sufficient volume, the speech input may not be understood correctly. Further, in a multi-user environment, if the speech input system does not properly identify the source of a speech input (e.g. if the system tries to interpret words coming from multiple users as a single command from a single user), a user may have difficulty in making speech inputs. Additionally, even where a speech input is received at sufficient volume from a determined user, ambiguities may be encountered in determining an intent of the user in making the speech input.

In light of such complexities, if a user provides a speech input and the system performs an action that is not related to the speech input, or fails to perform any action, it may be difficult to determine why the speech input was not properly interpreted. Therefore, embodiments are disclosed that relate to providing user interface feedback mechanisms in a speech recognition system. The disclosed feedback mechanisms may provide feedback regarding listening state, current speech input context, speech input volume, user identification, user location, real-time speech recognition confirmation, and/or other information as a user makes a speech input. Such feedback therefore may help to enable a user to understand whether a speech input is being received and correctly interpreted.

FIG. 1 shows an example embodiment of a multi-user environment 100 for a speech recognition system. The multi-user environment includes a first user 102 interacting with a computing system 104. The computing system 104 may be communicatively connected to other devices, such as a sensor system 106 and a display device 108. The sensor system 106 may comprise one or more depth cameras, one or more two-dimensional cameras, one or more microphones (e.g. a directional microphone array that permits the location from which speech inputs are received to be determined), and/or any other suitable sensors. The display device 108 includes a display 110 for presenting visual information to users. The environment 100 also illustrates a second user 112. The second user 112 may also provide speech inputs to the computing system 104, and/or may contribute background noise while the first user 102 makes speech inputs.

The first user 102 is illustrated as providing a speech input to control a video game application running on computing system 104. FIG. 1 also shows an example embodiment of a speech recognition feedback mechanism in the form of a graphical feedback indicator 114 displayed on the display 110. The depicted graphical feedback indicator 114 comprises a location and volume indicating feature 114a with a location that depicts a direction from which the speech input is being received, and with a length that indicates a detected volume of the speech input. In FIG. 1, the location and volume indicating feature 114a is positioned to indicate that the speech input being received is detected from a left side of the display from a viewer's perspective, which corresponds to a location of the first user 102. In contrast, if the system were to detect speech originating from the second user 112, the location and volume indicating feature 114a would be positioned on a right side of the graphical feedback indicator 114 to correspond with a location of the second user 112.

The graphical feedback indicator 114 is also depicted as providing feedback regarding recognized and/or understood speech inputs. In the depicted embodiment, an example of such feedback is shown as a text string showing the word "RELOAD" in response to the first user 102 speaking the word "RELOAD," or speaking another phrase that corresponds to the same user intent (e.g. "CHANGE AMMUNITION") such that the displayed text string corresponds to a canonical speech command corresponding to the received speech input. Such feedback may show the user in real-time the content of the speech input as understood by the system, and therefore alerts the user as to whether a speech input is understood correctly or incorrectly. In some embodiments, the computing system 104 may provide voice and/or non-voice audio feedback in addition to the graphical feedback indicator 114.

A graphical feedback indicator for a speech recognition system may comprise any suitable number and arrangement of visual feedback elements, including but not limited to iconography, text, images, etc., and may have any other suitable appearance. For example, a graphical feedback indicator 114 may be superimposed over displayable content of a user interface and/or visually integrated within the user interface. Example embodiments are described below with reference to FIGS. 4A-F and 5.

Figure 2:
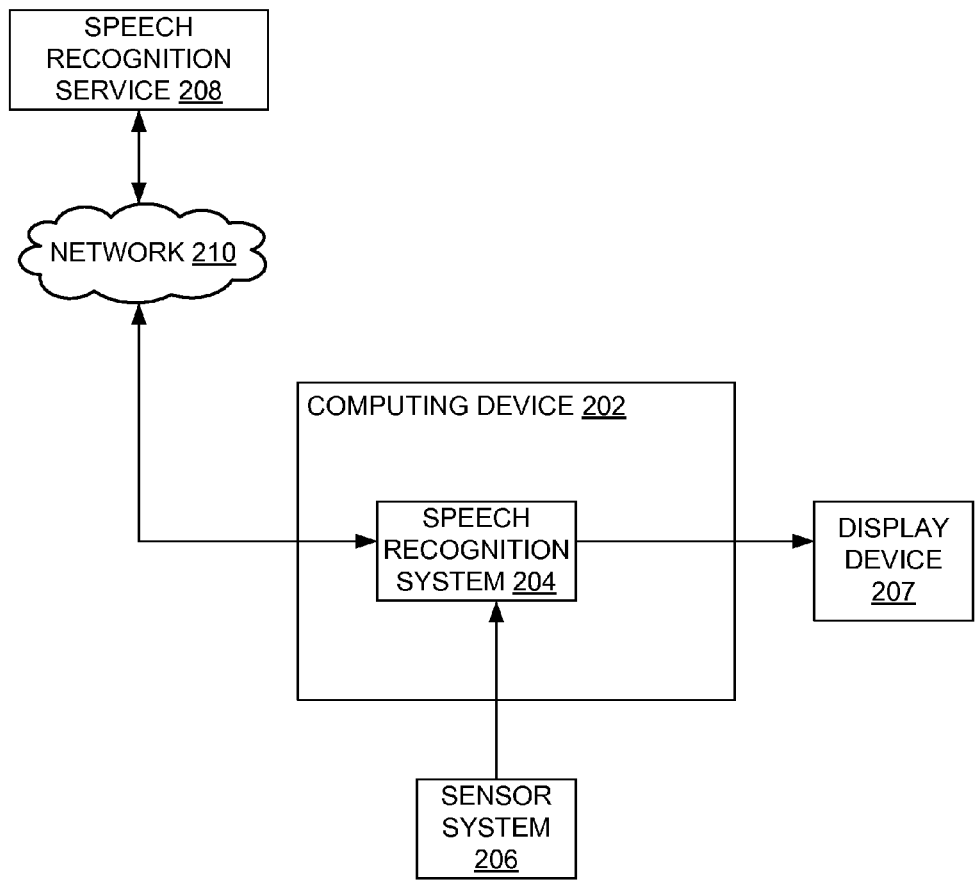
FIG. 2 shows a block diagram of an example speech recognition system in accordance with an embodiment of the present disclosure.

FIG. 2 shows a block diagram of an example embodiment of a speech recognition system 200. Speech recognition system comprises a computing device 202, which may represent computing system 104 or other suitable computing system. The computing device 202 includes computer-readable instructions stored in storage thereon that are executable to operate a speech recognition system 204. The speech recognition system 204 may be configured to receive speech inputs via a sensor system 206, which may represent sensor system 106 of FIG. 1 or other suitable sensor system configured to receive speech inputs. The computing device 202 also may be configured to provide outputs to a display device 207, including but not limited to outputs of a graphical feedback indicator configured to provide visual feedback for the speech recognition system 204. More details of an example computing system are discussed below with regard to FIG. 6.

In some embodiments, the speech recognition system 204 may be configured to communicate with an external speech recognition service 208 via a network 210 to assist with the speech recognition process. For example, raw speech data may be provided to the external speech recognition service 208 for identification of recognized speech segments. Further, recognized speech segments identified by the computing device 202 may be sent to the external speech recognition service for additional speech processing, e.g. natural language analysis, intent determination, disambiguation of ambiguous speech inputs, and/or other tasks.

Figure 3:
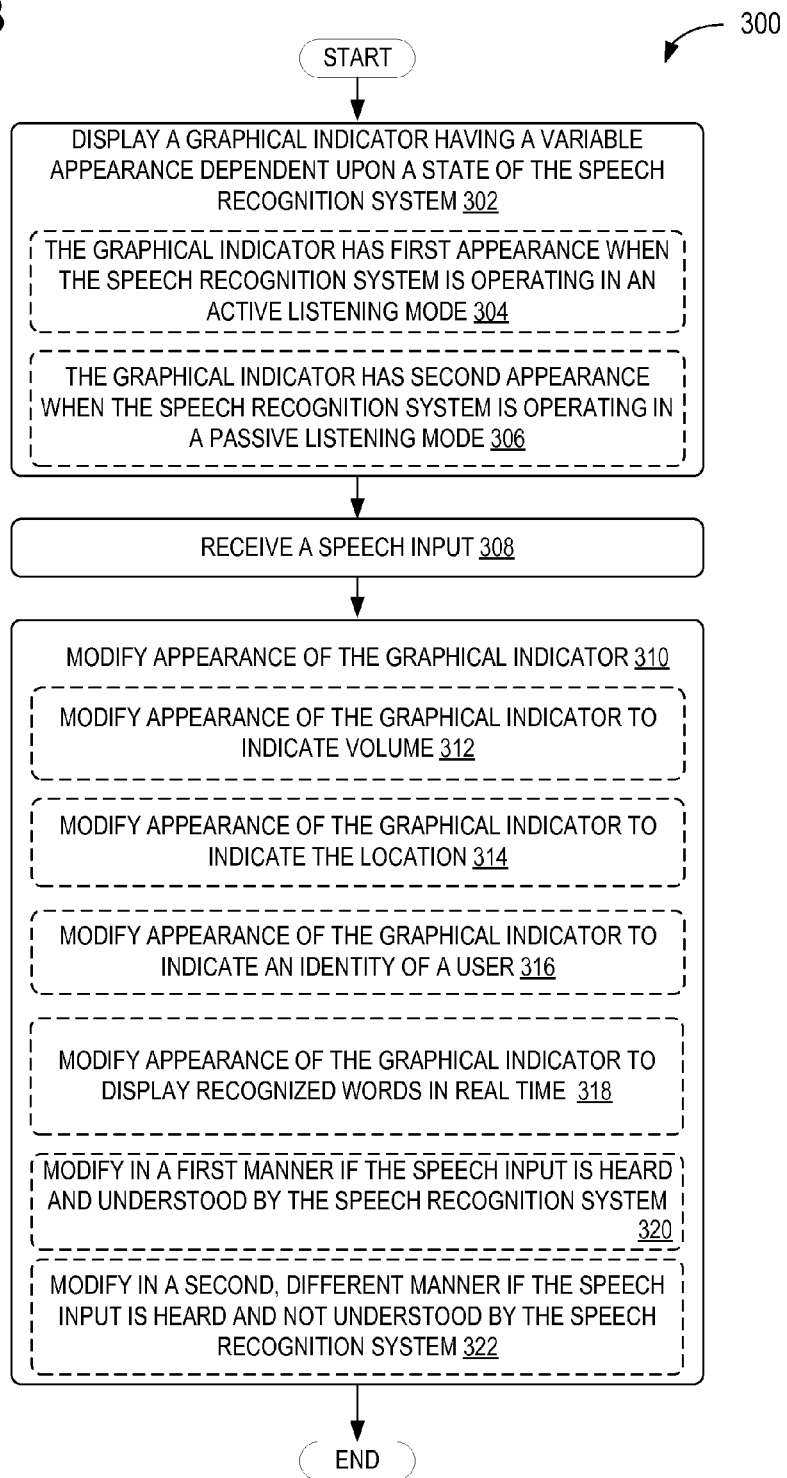
FIG. 3 shows a flow diagram depicting an embodiment of a method of providing feedback for a speech recognition system.

FIG. 3 shows a flow diagram depicting an embodiment of a method 300 for providing user feedback for a speech recognition system. Method 300 includes, at 302, displaying a graphical feedback indicator having a variable appearance dependent upon a state of the speech recognition system. For example, as indicated at 304, the graphical feedback indicator may have a first appearance when the speech recognition system is operating in an active listening mode, and, as indicated at 306, a second appearance when the speech recognition system is operating in a passive listening mode.

Figure 4A:
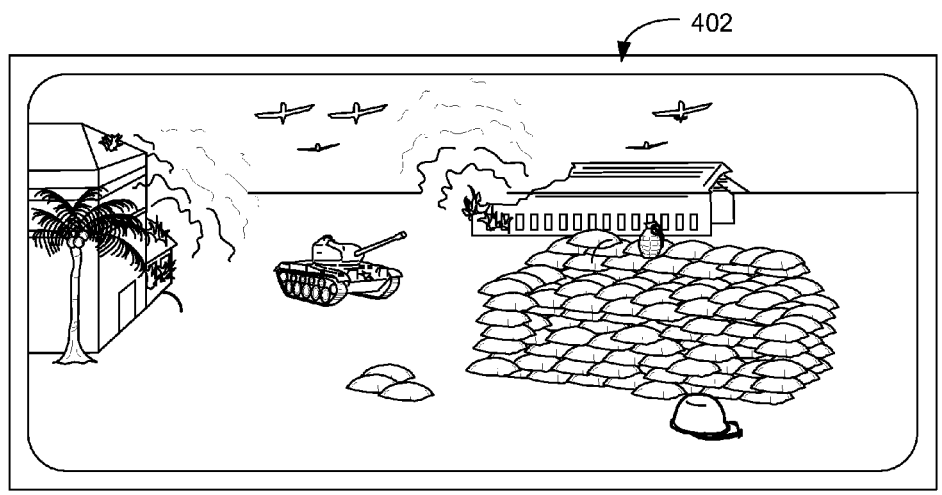
FIGS. 4A-4F show examples of feedback displayed on a display in accordance with an embodiment of the present disclosure.
Figure 4B:
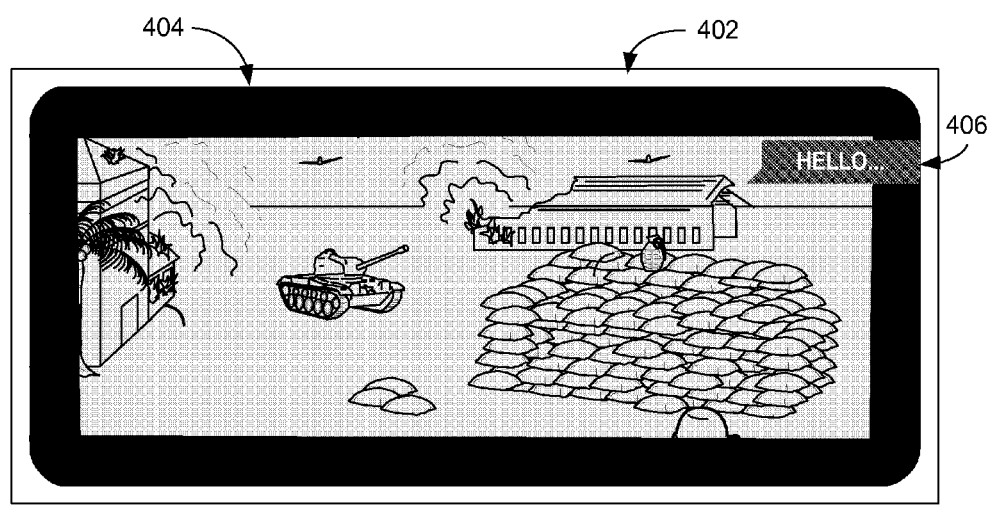
Figure 4C:
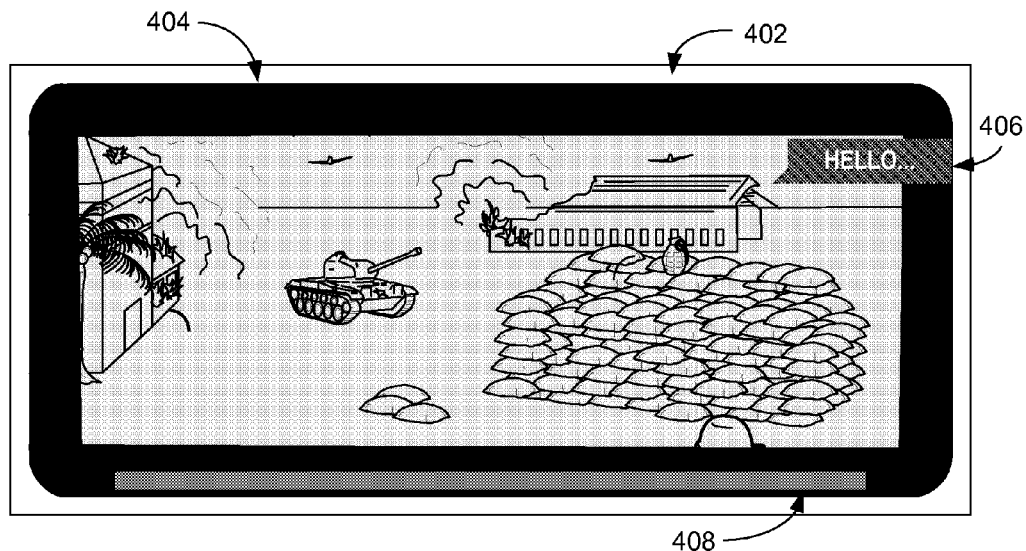

FIGS. 4A-4C show an embodiment of such a feedback mechanism for a speech recognition system in which a graphical feedback indicator is hidden during a passive listening mode and visible in an active listening mode. First, FIG. 4A illustrates a displayed user interface 402 for an application in which feedback indicators are hidden in a passive listening mode. Hiding a speech recognition feedback mechanism during passive listening mode may help to maintain a user's focus on content being viewed. In other embodiments, a graphical feedback indicator may be displayed with an appearance corresponding to a passive listening mode, as described below in the context of FIG. 5.

In response to receipt of a triggering input, the speech recognition system may enter an active listening mode in which a graphical feedback indicator is displayed. FIGS. 4B and 4C show examples of a graphical feedback indicator, in which the user interface 402 is partially obscured by a graphical frame of the graphical feedback indicator that indicates the speech recognition system being in active listening mode. In the depicted embodiment, the frame appears as an opaque border surrounding the user interface of the application, but may have any other suitable appearance.

The depicted frame (or other suitable representation of active listening mode) may indicate active listening in a global or local scope, and may have different appearances for each of these scopes to inform a user of a current context of the speech recognition system. Likewise, in some embodiments, a graphical feedback indicator may include a frame for one scope and not include a frame (but include other elements, as described below) for another scope. It will be understood that a local scope may correspond to an element of an application that is currently in focus on the computing device, while a global scope may correspond to a global application context, an operating system context, etc. As non-limiting examples, commands recognized when listening in a global scope may include multi-tasking commands, such as commands for applications that are not in focus, navigation shortcuts, system commands, or any other suitable command outside of a local context.

FIG. 4B also illustrates a textual feedback element 406. The textual feedback element 406 may provide any suitable information to the user. The depicted textual feedback element 406 is depicted as providing a prompt for a user to make a speech input, thereby further helping to indicate that the speech recognition system is in an active listening mode. Textual elements also may be used to provide feedback regarding suggestions for the user to follow to assist the speech recognition system in understanding a speech input (e.g. by asking for clarification). Textual elements also may be used to provide suggestions for common ways to continue from a current state and/or to prompt a user to continue providing speech input to the speech recognition system.

Turning briefly back to FIG. 3, method 300 comprises, at 308, receiving a speech input, and at 310, modifying an appearance of the graphical feedback indicator in response to receipt of the speech input to indicate to users that the speech input was detected. The appearance of the graphical feedback indicator may be modified in any suitable manner. For example, FIG. 4C illustrates modifying of the graphical feedback indicator by adding an additional element in the form of an indicator track 408, wherein the indicator track 408 may be displayed upon initiation of receipt of a speech input.

Figure 4D:
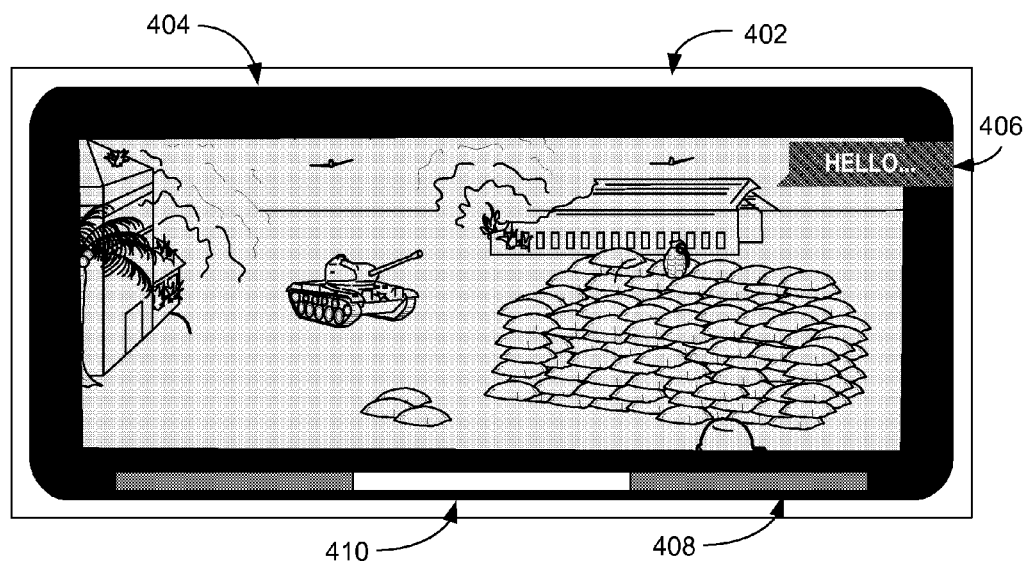
Figure 4E:
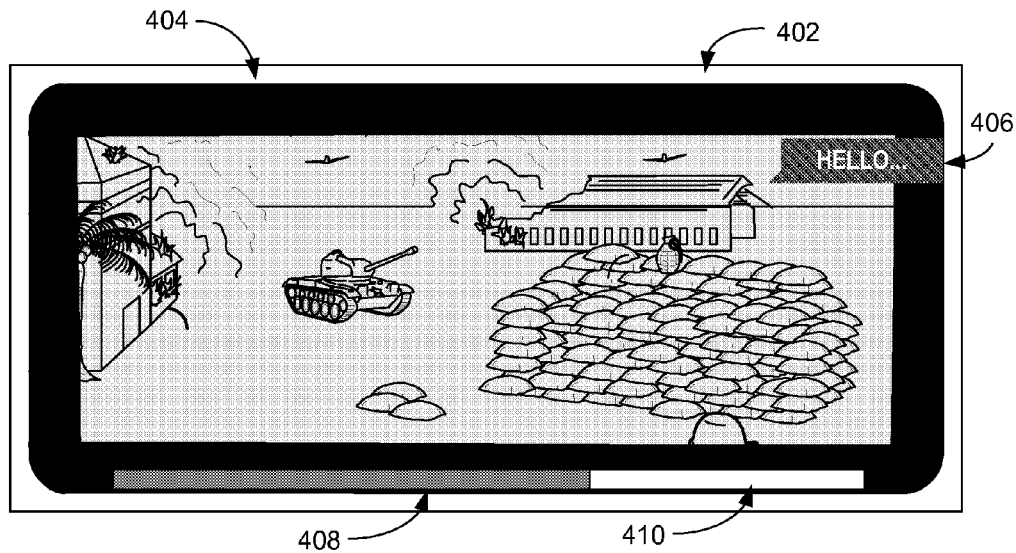

Further, the indicator track 408 may be used to indicate such features as a volume of the received speech input, as indicated in FIG. 3 at 312, and/or a direction from which a speech input is received, as indicated in FIG. 3 at 314. FIG. 4D shows an embodiment of a volume and location indicator 410 positioned on the indicator track, wherein a length of the volume and location indicator 410 may indicate a volume of a speech input being received. Further, as illustrated in FIG. 4E, a location of the volume and location indicator 410 along the indicator track 408 may be varied to indicate a direction from which the speech input was received. This information may help users understand whether a speech input is made at a loud enough volume to be understood by the system, and also to understand which user currently has speech recognition system focus. Further, the location and/or length of the volume and location indicator may be adjusted in real time to adjust to and indicate changes in user location, speech volume, user focus, etc.

While shown as a rectangular bar extending horizontally across a bottom of the graphical feedback indicator, it will be understood that the indicator track 408 may have any suitable configuration. For example, the indicator track 408 may have a vertical or other suitable orientation and/or be located in any suitable region of the display 402. Further, as described below with regard to FIG. 5, in some embodiments the indicator track may not be linear, but instead may be curved or otherwise have a nonlinear configuration.

The location of a user from which speech input is being received may be determined in any suitable manner. For example, as mentioned above, a directional microphone array may provide data useable to determine a direction from which a speech input is received. Further, in some embodiments, a location of a user providing speech input may be determined by correlating image data of an environment of the speech recognition system with the received speech input. For example, the computing device may utilize data received from a depth camera and/or a two-dimensional camera to analyze facial features of one or more users and determine which user is speaking in correlation with received speech input.

In some embodiments, the indicator track 408 may be partitioned into multiple sections, such that each section corresponds to a different location within an environment of the speech recognition system. Accordingly, a determined volume may be indicated as a proportion of a length of an associated section of the indicator track 408. In some embodiments, the indicator track 408 may be partitioned into a number of sections equal to a number of users detected within an environment of the speech recognition system.

Referring again to FIG. 3, method 300 further may optionally include identifying a user from whom a speech input is being received, and modifying the appearance of the graphical feedback indicator to indicate the identity of the speaking user, as indicated at 316. A user may be identified in any suitable manner. For example, in some embodiments, the computing device may identify a speaker via a voice print analysis in which the speech input is compared to known voice patterns for one or more users. Further, a user may be identified via depth images and/or two-dimensional images via facial/body recognition methods. An example embodiment of a graphical feedback indicator that displays a user identity is described below with reference to FIG. 5.

As another example of a feedback mechanism, method 300 further may comprise modifying the appearance of the graphical feedback indicator to display words of the speech input in real time as the words are recognized, as indicated at 318. Such feedback may be referred to as a continuous speech recognition mode, and may allow a user to confirm that a speech input is being recognized correctly by the speech recognition system. This may allow a user to make corrections or clarifications during the input, rather than after making the input and waiting for the corresponding action to be performed.

Figure 4F:
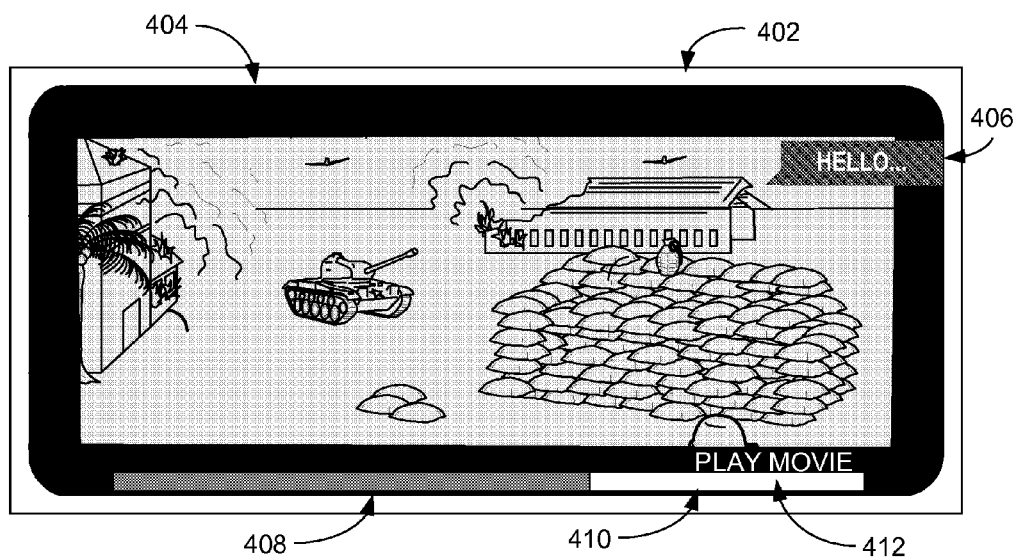

FIG. 4F illustrates an example embodiment of the graphical feedback indicator of FIGS. 4A-4E operating in a continuous speech recognition mode, and illustrates a real-time speech input indicator 412. The real-time speech input indicator 412 displays a textual representation of a word or words spoken by a user (e.g. "PLAY MOVIE") in real-time as the words are recognized by the speech recognition system. In the depicted embodiment, the real-time speech input indicator 412 is positioned directly above the volume and location indicator 410. However, the real-time speech input indicator 412 may be positioned in any suitable location on the display 402.

In some embodiments, the real-time speech input indicator 412 may emphasize one or more keywords and/or portions of the recognized words that are associated with a known voice command, person, application, and/or other content recognized by the system. Such keywords may be emphasized in any suitable manner. For example, the real-time speech input indicator 412 may display the one or more keywords and/or portions of the recognized words in a larger size, a different color, with a highlighted background, etc.

The continuous speech recognition mode is one non-limiting example of feedback that may be utilized to indicate to a user whether a speech input is heard and understood by the speech recognition system. However, any other suitable mechanism may be used to indicate whether a speech input that is heard is also understood. For example, different colors, selected symbols (e.g. a question mark instead of recognized text), and/or any other suitable modifications of the appearance of the graphical indictor may be used to indicate that a speech input is heard but not understood. As such, method 300 may comprise, at 320, modifying the appearance of the graphical feedback indicator in a first manner if the speech input is heard and understood by the speech recognition system, and at 322, modifying the appearance of the graphical feedback indicator in a second, different manner if the speech input is heard but not understood by the speech recognition system.

Figure 5:
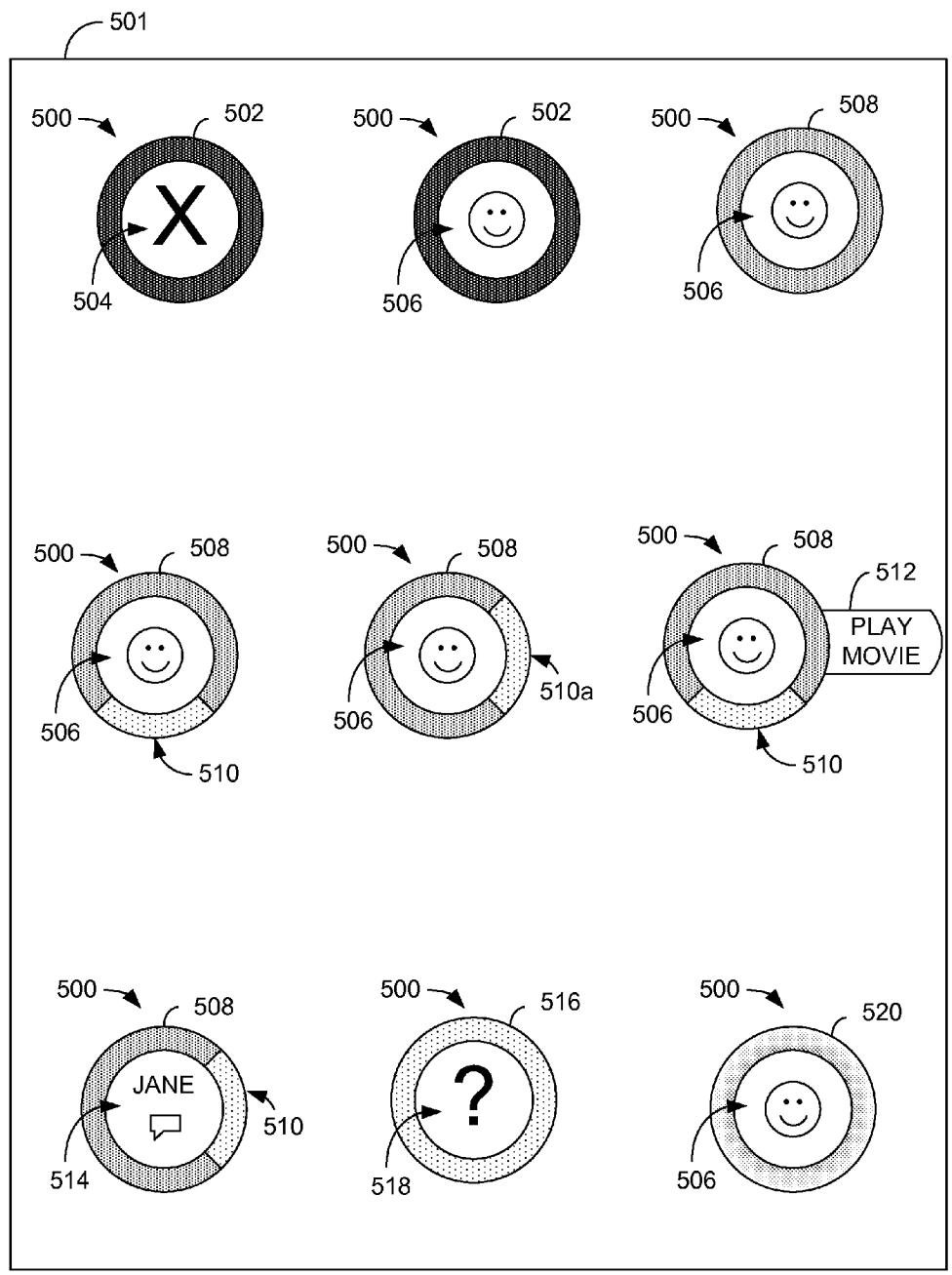
FIG. 5 shows examples of feedback with a compact appearance in accordance with another embodiment of the present disclosure.

FIG. 5 illustrates another embodiment of a graphical feedback indicator 500 for a speech recognition system in various feedback states. Graphical feedback indicator 500 has a more compact layout than the embodiment of FIGS. 4A-4F, and thus may be used in settings where a more compact representation is desired. For example, the graphical feedback indicator 500 may be displayed in a corner or edge of an application window or other user interface.

The depicted graphical feedback indicator 500 takes the form of a circle defining an inner region, wherein the circle and the inner region each may be used to provide feedback. For example, a first appearance 502 of an outer ring (e.g. a first color) and a first element 504 located within the inner region may be utilized to indicate a passive listening mode. The depicted first element 504 comprises an "X," but it will be understood that any other suitable indicator may be used.

Next, upon entering an active listening mode, different appearances may be used to indicate a global or local scope active listening mode. For example, a combination of the first appearance 502 of the outer ring and a second element 506 located within the inner region may be used to indicate a global scope, while a second appearance 508 of the outer ring in combination with the second element 506 located within the inner region may be used to indicate a local scope. While the second element 506 is illustrated as a smiley face, it will be understood that any other suitable indicator may be used.

FIG. 5 also illustrates a volume and location indicator 510 as occupying a portion of the outer ring. A volume of detected sound or speech currently in focus may be indicated, for example, by a length of the volume and location indicator 510. Further, a location of a user from which the speech input is being received may be illustrated by a location of the volume and location indicator 510 on the outer ring, as shown at 510a. For example, the volume and location indicator 510 may appear along a bottom of the outer ring when a speech input is determined to originate from a middle of a room. Similarly, the volume indicator 510 may appear along a left side of the outer ring when a speech input is determined to have originated from a left side of the room. The length and/or location of the volume and location indicator 510 may change in real time to provide continuous and real-time feedback to users. It will be understood that, in some embodiments, indicator 510 may represent location and not volume, or volume and not location.

Further, the graphical feedback indicator 500 may be configured to display a real-time recognized speech indicator 512 in a continuous recognition mode. The real-time recognized speech indicator 512 may be displayed in any suitable manner. For example, in some embodiments, the real-time recognized speech indicator 512 may take the form of animated or stationary flyout that is displayed to a side of the outer ring of the graphical feedback indicator. Further, in some embodiments, the recognized speech indicator 512 may be displayed in a position corresponding to a location of a user providing the recognized speech input, and as such provide locational feedback.

The graphical feedback indicator 500 also may be utilized to display a determined identify of a user currently entering a speech input. For example, the inner region of the graphical feedback indicator 500 may display the first name 514 of an identified user, and/or may indicate the identity of the user in any other suitable manner (e.g. by displaying an avatar or other image associated with the user, a user name of the user, etc.).

Further, the graphical feedback indicator 500 may be configured to have different appearances for indicating whether a heard speech input is understood. For example, a continuous recognition mode text display or other affirmative indicating element may be used to indicate that a speech input is understood, while a non-affirmative element, such as a question mark 518, may be displayed within the inner region to indicate that a heard speech input was not understood. Additionally, the outer ring may be displayed with a third appearance 516 (e.g. different color, texture, etc.) to provide further user feedback that the speech input was not understood.

The appearance of the graphical feedback indicator 500 may also be modified to indicate a particular level (e.g., low, medium, high, etc.) of recognition confidence and/or uncertainty associated with a speech input. For example, a command may be ambiguous due to unclear speech input and/or due to two commands being phonetically similar. Thus, in some embodiments, the graphical feedback indicator 500 may include a prompt or interactive element to disambiguate the low confidence speech input, for example, by presenting two or more possible commands and/or speech recognition results from which a user may select an intended word and/or command.

Likewise, where a user input is heard and understood without ambiguity, the outer ring may be displayed with a fourth appearance 520 indicating the heard-and-understood state. For example, the fourth appearance 520 may feature an animated or stationary gradient of color and/or brightness, and/or may have any other suitable appearance. Additionally, text representing the heard-and-understood speech input may be displayed as further feedback. This text may either represent the exact words spoken by the user, or a representation of the intent as understood by the system.

In some embodiments, the methods and processes described herein may be tied to a computing system of one or more computing devices. In particular, such methods and processes may be implemented as a computer-application program or service, an application-programming interface (API), a library, and/or other computer-program product.

Figure 6:
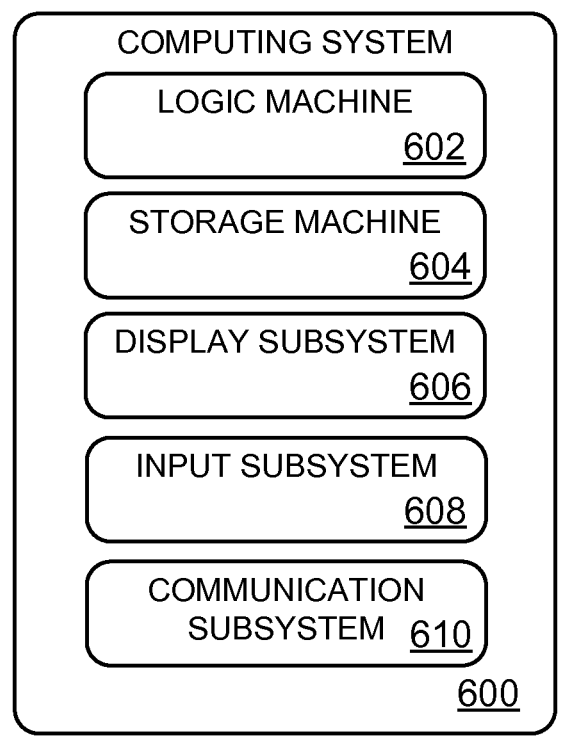
FIG. 6 shows a block diagram of an example computing system in accordance with an embodiment of the present disclosure.

FIG. 6 schematically shows a non-limiting embodiment of a computing system 600 that can enact one or more of the methods and processes described above. The computing system 600 is shown in simplified form. The computing system 600 may take the form of one or more gaming consoles, mobile communication devices (e.g., smart phone), mobile computing devices, tablet computers, server computers, home-entertainment computers, network computing devices, personal computers, and/or other computing devices.

The computing system 600 includes a logic machine 602 and a storage machine 604. The computing system 600 may optionally include a display subsystem 606, an input subsystem 608, a communication subsystem 610, and/or other components not shown in FIG. 6.

The logic machine 602 includes one or more physical devices configured to execute instructions. For example, the logic machine may be configured to execute computer-readable instructions that are part of one or more applications, services, programs, routines, libraries, objects, components, data structures, or other logical constructs. Such instructions may be implemented to perform a task, implement a data type, transform the state of one or more components, achieve a technical effect, or otherwise arrive at a desired result.

The logic machine may include one or more processors configured to execute software instructions. Additionally or alternatively, the logic machine may include one or more hardware or firmware logic machines configured to execute hardware or firmware instructions. Processors of the logic machine may be single-core or multi-core, and the instructions executed thereon may be configured for sequential, parallel, and/or distributed processing. Individual components of the logic machine optionally may be distributed among two or more separate devices, which may be remotely located and/or configured for coordinated processing. Aspects of the logic machine may be virtualized and executed by remotely accessible, networked computing devices configured in a cloud-computing configuration.

The storage machine 604 includes one or more physical devices configured to store and hold instructions (e.g., computer-readable instructions) executable by the logic machine to implement the methods and processes described herein. For example, the logic machine 602 may be in operative communication with a sensor interface (e.g. an interface of the sensor system 106 of FIG. 1), and the storage machine 604. When such methods and processes are implemented, the state of the storage machine 604 may be transformed—e.g., to hold different data.

The storage machine 604 may include removable and/or built-in devices. The storage machine 604 may include optical memory (e.g., CD, DVD, HD-DVD, Blu-Ray Disc, etc.), semiconductor memory (e.g., RAM, EPROM, EEPROM, etc.), and/or magnetic memory (e.g., hard-disk drive, floppy-disk drive, tape drive, MRAM, etc.), among others. Storage machine 604 may include volatile, nonvolatile, dynamic, static, read/write, read-only, random-access, sequential-access, location-addressable, file-addressable, and/or content-addressable devices.

It will be appreciated that the storage machine 604 includes one or more physical devices. However, aspects of the instructions described herein alternatively may be propagated by a communication medium (e.g., an electromagnetic signal, an optical signal, etc.).

Aspects of the logic machine 602 and the storage machine 604 may be integrated together into one or more hardware-logic components. Such hardware-logic components may include field-programmable gate arrays (FPGAs), program- and application-specific integrated circuits (PASIC/ASICs), program- and application-specific standard products (PSSP/ASSPs), system-on-a-chip (SOC), and complex programmable logic devices (CPLDs), for example.

When included, the display subsystem 606 may be used to present a visual representation of data held by the storage machine 604. This visual representation may take the form of a graphical user interface (GUI) displayed on a display such as display 110 of FIG. 1. As the herein described methods and processes change the data held by the storage machine, and thus transform the state of the storage machine, the state of display subsystem 606 may likewise be transformed to visually represent changes in the underlying data. The display subsystem 606 may include one or more display devices utilizing virtually any type of technology. Such display devices may be combined with the logic machine 602 and/or the storage machine 604 in a shared enclosure, or such display devices may be peripheral display devices.

When included, the input subsystem 608 may comprise or interface with one or more user-input devices such as a touch screen, keyboard, mouse, microphone, or game controller. For example, the input subsystem may include or interface with the computing system 104 of FIG. 1. In some embodiments, the input subsystem may comprise or interface with selected natural user input (NUI) componentry. Such componentry may be integrated or peripheral, and the transduction and/or processing of input actions may be handled on- or off-board. Example NUI componentry may include a microphone for speech and/or voice recognition; an infrared, color, stereoscopic, and/or depth camera for machine vision and/or gesture recognition; a head tracker, eye tracker, accelerometer, and/or gyroscope for motion detection and/or intent recognition; as well as electric-field sensing componentry for assessing brain activity.

When included, the communication subsystem 610 may be configured to communicatively couple the computing system 600 with one or more other computing devices. The communication subsystem 610 may include wired and/or wireless communication devices compatible with one or more different communication protocols. As non-limiting examples, the communication subsystem may be configured for communication via a wireless telephone network, or a wired or wireless local- or wide-area network. In some embodiments, the communication subsystem may allow the computing system 600 to send and/or receive messages to and/or from other devices via a network such as the Internet.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and non-obvious combinations and sub-combinations of the various processes, systems and configurations, and other features, functions, acts, and/or properties disclosed herein, as well as any and all equivalents thereof.

The invention claimed is:

1. On a computing device, a method of providing user feedback for a speech recognition system, the method comprising:
displaying a graphical feedback indicator with an appearance that indicates the speech recognition system is in a passive listening mode;
receiving a triggering input;
in response to the triggering input, modifying an appearance of the graphical feedback indicator to have an appearance that indicates the speech recognition system is in an active listening mode;
while in the active listening mode, receiving a speech input;
when the speech recognition system understands the speech input, modifying the appearance of the graphical feedback indicator to have an appearance that indicates that the speech input is understood by the system, determining a location of a user providing the speech input, and modifying the appearance of the graphical feedback indicator to indicate the location of the user by adjusting a location of a volume indicator in a direction corresponding to the location of the user, the volume indicator comprising a ring-shaped portion of the indicator having a bar that represents a volume, wherein adjusting a location indicator comprises moving the bar to a side corresponding to the location of the user providing the speech input; and
when the speech recognition system does not understand the speech input, then modifying the appearance of the graphical feedback indicator in a different manner to have an appearance that indicates the speech input is not understood by the system.

2. The method of claim 1, further comprising determining the volume of the speech input and modifying a length of the volume indicator to indicate the volume.

3. The method of claim 1, further comprising modifying the appearance of the graphical feedback indicator during a continuous speech recognition mode to display one or more words of the speech input in real-time as each word is recognized.

4. The method of claim 1, further comprising identifying the user providing the speech input, and modifying the appearance of the graphical feedback indicator to indicate an identity of the user.

5. The method of claim 1, wherein modifying the appearance of the graphical feedback indicator in the different manner comprises displaying a prompt for the user to provide additional user input.

6. The method of claim 1, further comprising modifying the appearance of the graphical feedback indicator from the passive listening mode to a different, active listening mode by maintaining a shape of the graphical feedback indicator while modifying the appearance.

7. A method of providing feedback for a speech recognition system of a computing device, the method comprising:
displaying a graphical feedback indicator with an appearance indicating that the speech recognition system is in a passive listening mode, the graphical feedback indicator having a variable appearance depending upon a state of the speech recognition system;
receiving a triggering input;
in response to the triggering input, modifying the appearance of the graphical feedback indicator to have an appearance that indicates the speech recognition system is in an active listening mode;
while in the active listening mode, receiving a speech input;
when the speech input is heard, modifying the appearance of the graphical feedback indicator to indicate that the speech input is heard;
when the speech input is understood, modifying the appearance of the graphical feedback indicator to indicate that the speech input is understood, determining a location of a user providing the speech input, and modifying the appearance of the graphical feedback indicator to indicate the location of the user by adjusting a location of a volume indicator in a direction corresponding to the location of the user, the volume indicator comprising a ring-shaped portion of the indicator having a bar that represents a volume, wherein adjusting a location indicator comprises moving the bar to a side corresponding to the location of the user providing the speech input; and
when the speech input is not understood, modifying the appearance of the graphical feedback indicator to indicate that the speech is not understood.

8. The method of claim 7, wherein the appearance that indicates that the speech recognition system is in the active listening mode comprises an appearance that indicates the speech recognition system is in the active listening mode in a local context.

9. The method of claim 7, wherein the appearance that indicates that the speech recognition system is in the active listening mode comprises an appearance that indicates that the speech recognition system is in the active listening mode in a global context.

10. The method of claim 7, further comprising modifying the appearance of the graphical feedback indicator during a continuous speech recognition mode to indicate one or more words of the speech input as the speech input is recognized.

11. The method of claim 7, further comprising modifying the appearance of the graphical feedback indicator to identify one or more words corresponding to a canonical form of a speech command corresponding to the speech input.

12. The method of claim 7, further comprising modifying the appearance of the graphical feedback indicator to indicate an uncertainty in a recognition of the speech input.

13. The method of claim 12, wherein indicating the uncertainty in the recognition of the speech input includes displaying two or more possible speech recognition results for the speech input.

14. A computing system for performing speech recognition and providing feedback regarding the speech recognition, the computing system comprising:
a logic machine; and
a storage machine comprising instructions executable by the logic machine to:
output to a display device a graphical feedback indicator with an appearance indicating that a speech recognition system is in a passive listening mode, the graphical feedback indicator having a variable appearance depending upon a state of the speech recognition system;
receiving a triggering input;
in response to the triggering input, modifying an appearance of the graphical feedback indicator to have an appearance that indicates that the speech recognition system is in an active listening mode;
receive, from one or more microphones, a speech input;
when the speech input is heard, modify the appearance of the graphical feedback indicator to indicate that the speech input is heard; and
when the speech input is understood, modify the appearance of the graphical feedback indicator to indicate that the speech input is understood, determining a location of a user providing the speech input, and modifying the appearance of the graphical feedback indicator to indicate the location of the user by adjusting a location of a volume indicator in a direction corresponding to the location of the user, the volume indicator comprising a ring-shaped portion of the indicator having a bar that represents a volume, wherein adjusting a location indicator comprises moving the bar to a side corresponding to the location of the user providing the speech input.

15. The computing system of claim 14, the instructions being further executable to modify the appearance of the graphical feedback indicator to indicate whether the speech input is to be applied in a global operating system context or a local application context.

16. The computing system of claim 14, the instructions being further executable to determine an identity of the user, and to modify the appearance of the graphical feedback indicator to display the identity of the user.

* * * * *